(12) United States Patent
Karumuri et al.

(10) Patent No.: US 12,136,180 B1
(45) Date of Patent: Nov. 5, 2024

(54) VIRTUAL SHOE TRY-ON

(71) Applicant: Amazon Technologies, Inc., Seattle, WA (US)

(72) Inventors: Gitika Karumuri, Santa Clara, CA (US); Sunil Sharadchandra Hadap, Dublin, CA (US); Ashwin Swaminathan, Dublin, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 93 days.

(21) Appl. No.: 17/744,409

(22) Filed: May 13, 2022

(51) Int. Cl.
  *G06T 19/20*  (2011.01)
  *G06Q 30/0601*  (2023.01)
  *G06T 7/60*  (2017.01)
  *G06T 7/70*  (2017.01)

(52) U.S. Cl.
  CPC ......... *G06T 19/20* (2013.01); *G06Q 30/0643* (2013.01); *G06T 7/60* (2013.01); *G06T 7/70* (2017.01); *G06T 2207/20081* (2013.01); *G06T 2207/30196* (2013.01); *G06T 2210/21* (2013.01); *G06T 2219/2004* (2013.01); *G06T 2219/2016* (2013.01)

(58) Field of Classification Search
  None
  See application file for complete search history.

(56) References Cited

U.S. PATENT DOCUMENTS

| | | | |
|---|---|---|---|
| 9,460,557 B1 * | 10/2016 | Tran | G06T 15/205 |
| 9,996,981 B1 | 6/2018 | Tran | |
| 10,732,261 B1 | 8/2020 | Wang | |
| 11,176,738 B2 * | 11/2021 | Revkov | G06T 15/30 |
| 11,574,421 B2 | 2/2023 | Koh | |
| 2007/0273711 A1 * | 11/2007 | Maffei | G06T 17/20 345/639 |
| 2013/0215116 A1 | 8/2013 | Siddique | |
| 2015/0199816 A1 | 7/2015 | Freeman | |
| 2017/0032579 A1 | 2/2017 | Eisemann | |
| 2017/0053335 A1 | 2/2017 | Hanscom | |
| 2017/0249783 A1 | 8/2017 | Mach Shepherd | |
| 2017/0272728 A1 | 9/2017 | Rafii | |

(Continued)

OTHER PUBLICATIONS

Chou et al.; Pivtons: Pose invariant virtual try-on shoe with conditional image completion; Computer Vision-ACCV 2018: 14th Asian Conference on Computer Vision; Perth, Australia, Dec. 2018 pp. 654-668.

(Continued)

*Primary Examiner* — Tize Ma
(74) *Attorney, Agent, or Firm* — K&L Gates LLP

(57) ABSTRACT

The present disclosure describes a system and method for implementing a virtual shoe try-on feature. The method includes predicting, using a machine learning model, a first plurality of pixels including pixels of an image corresponding to a foot in the image and adding a first virtual cylindrical object to a three-dimensional model of a shoe such that a portion of the first virtual cylindrical object is positioned within the three-dimensional model of the shoe. The method also include determining a set of pixels including pixels of the first plurality of pixels that intersect with the first virtual cylindrical object and removing, from the three-dimensional model of the shoe, a first portion of the three-dimensional model of the shoe that intersects with the set of pixels.

20 Claims, 14 Drawing Sheets

(56) References Cited

U.S. PATENT DOCUMENTS

| | | | |
|---|---|---|---|
| 2018/0033202 A1 | 2/2018 | Lam | |
| 2018/0247426 A1* | 8/2018 | Gluck | G06Q 30/0643 |
| 2018/0253906 A1 | 9/2018 | Tran | |
| 2019/0220685 A1 | 7/2019 | Uchiyama | |
| 2020/0000180 A1* | 1/2020 | Sherrah | H04N 7/18 |
| 2020/0065991 A1 | 2/2020 | Chu | |
| 2020/0320769 A1 | 10/2020 | Chen | |
| 2020/0334736 A1 | 10/2020 | Crabtree | |
| 2021/0125405 A1 | 4/2021 | Tran | |
| 2022/0101417 A1 | 3/2022 | Boscolo | |
| 2022/0110413 A1* | 4/2022 | Che | B33Y 10/00 |
| 2022/0270297 A1* | 8/2022 | Koh | G06N 3/08 |
| 2023/0230332 A1 | 7/2023 | Stoddart | |

OTHER PUBLICATIONS

Shan et al.; ARShoe: Real-time augmented reality shoe try-on system on smartphones; Proceedings of the 29th ACM International Conference on Multimedia. 2021; Oct. 2021; pp. 1111-1119.

* cited by examiner

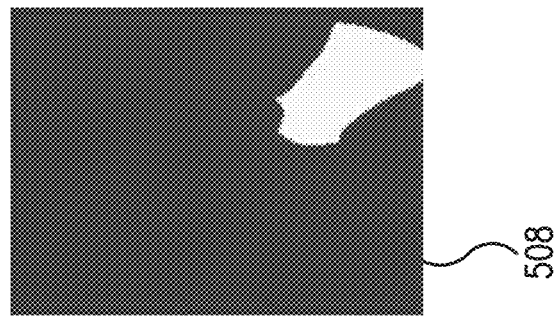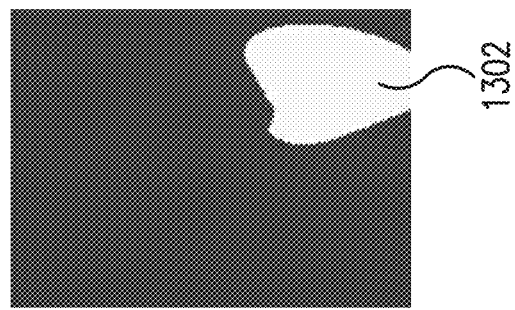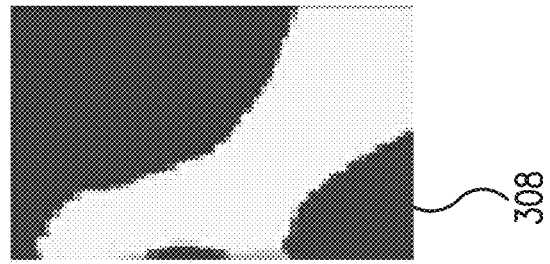
FIG. 14

VIRTUAL SHOE TRY-ON

BACKGROUND

The present disclosure relates to shoes, and more specifically, to fitting shoes on a person's feet. One challenge of purchasing shoes online is that a user may not have the opportunity to test the shoes on the user's feet before purchasing, and thus, it may be difficult to find shoes that are a good fit on the user's feet.

BRIEF DESCRIPTION OF DRAWINGS

FIG. 14 illustrates an example generation of a segmentation mask in the system of FIG. 1.

DETAILED DESCRIPTION

The present disclosure describes a virtual shoe try-on feature that allows a user to see how a shoe will look on the user's foot before the user purchases the shoe. The virtual shoe try-on feature uses machine learning to predict how a shoe will fit onto an image of the user's foot (e.g., a frame of a video of the user's foot). The feature then generates and superimposes a two-dimensional (2D) model of the shoe onto the image to show the user how the shoe will look on the user's foot. In this manner, the user may see the shoe superimposed onto the user's foot in a video concurrently captured by the user's mobile device.

A challenge that arises when generating the 2D model of the shoe is determining what portions of the shoe should be occluded by the user's foot, and vice versa. If the occlusions are determined incorrectly or inaccurately, when the 2D model is superimposed onto the image of the user's foot, it will not appear as if the user is wearing the shoe on the foot. Rather portions of the shoe may appear to be empty or certain portions of the user's foot will show through the shoe, which is unrealistic.

The present disclosure describes a system that determines which portions of the shoe should be occluded by the user's foot, and vice versa. The system uses machine learning to analyze the image of the user's foot to make predictions about the foot (e.g., an orientation, scale, and position). The system also predicts a segmentation mask that indicates the image pixels for the foot, leg, or garments (e.g., pants) shown in the image. The system retrieves a three-dimensional (3D) model of a desired shoe and adds, to the 3D model, various virtual objects. For example, the system may add one or more cylindrical objects inside the 3D model of the shoe to simulate a foot or an ankle. As another example, the system may add a conical object that extends out of the 3D model of the shoe to simulate the range of motion of a leg. The system then takes the intersection of the segmentation mask (e.g., the pixels for the foot and the leg in the image) and the virtual objects to generate a second segmentation mask. The system removes portions of the 3D model of the shoe that intersect with the second segmentation mask. After removing these portions, the system generates the 2D model of the shoe using the 3D model of the shoe. The system then superimposes the 2D model onto the image to simulate the look and fit of the shoe on the user's foot. In this manner, the system improves the accuracy and realistic look of the simulation, in certain embodiments.

Figure 1:
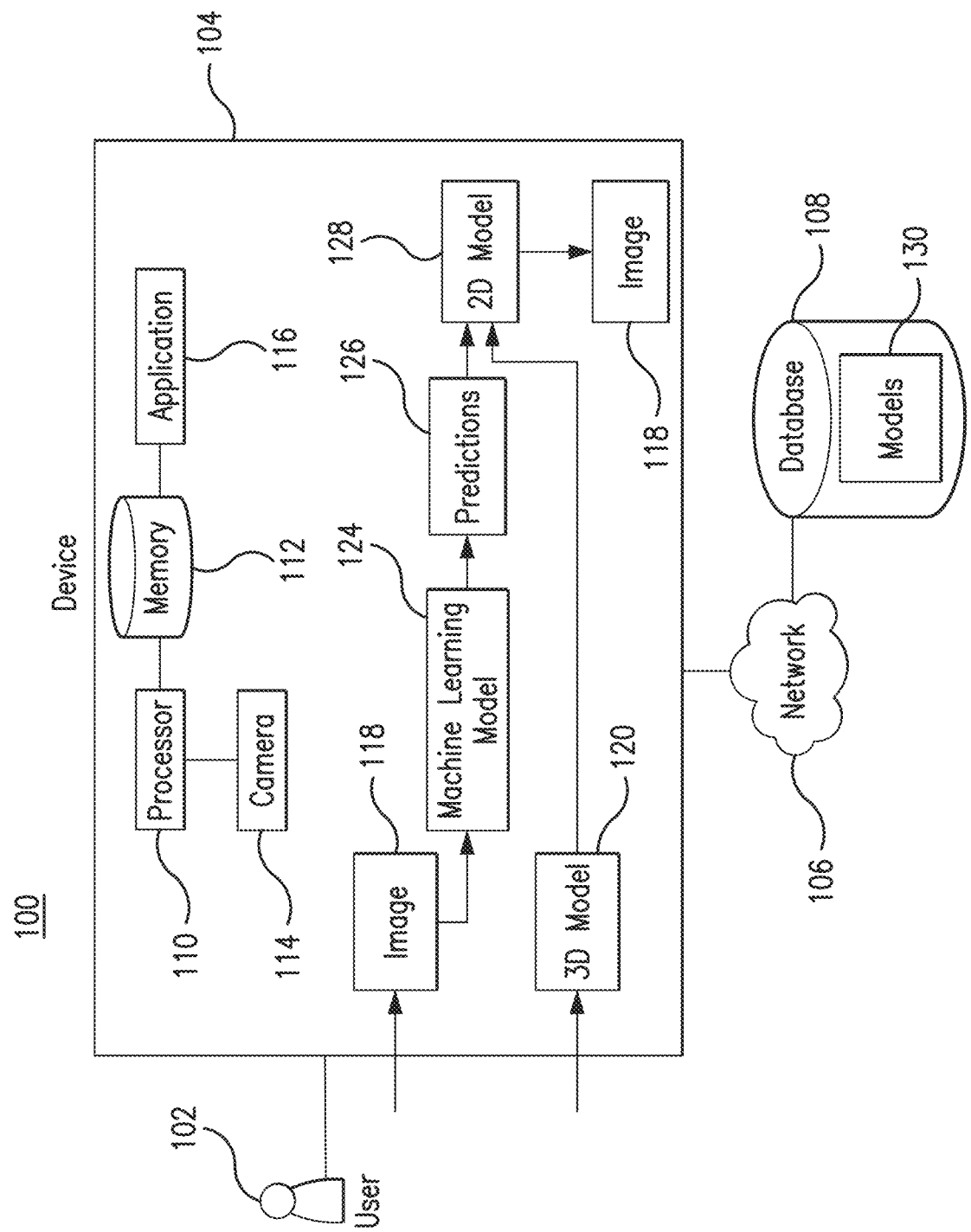
FIG. 1 illustrates an example system.

FIG. 1 illustrates an example system 100. As seen in FIG. 1, the system 100 includes a device 104, a network 106, and a database 108. Generally, the system 100 implements a virtual shoe try-on feature that allows a user 102 to see how a shoe would fit on the user's 102 foot before purchasing the shoe. The system 100 uses machine learning to generate a virtual model of a shoe based on a captured image of the user's 102 foot. The system 100 then superimposes the model of the shoe onto the image of the user's 102 foot to simulate the fit of the shoe on the user's 102 foot.

The device 104 may be a personal device of the user 102, such as, for example, a mobile phone or a laptop of the user 102. The user 102 uses the device 104 to shop for shoes online. When the user 102 finds a pair of shoes that the user 102 likes, the user 102 may use the virtual shoe try-on feature implemented by the device 104 to simulate the look and fit of the shoe on the user's 102 foot. As see in FIG. 1, the device 104 includes a processor 110, memory 112, and camera 114 that perform the actions and functions of the device 104.

The device 104 is any suitable device for communicating with components of the system 100 over the network 106. As an example and not by way of limitation, the device 104 may be a computer, a laptop, a wireless or cellular telephone, an electronic notebook, a personal digital assistant, a tablet, or any other device capable of receiving, processing, storing, or communicating information with other components of the system 100. The device 104 may be a wearable device such as a virtual reality or augmented reality headset, a smart watch, or smart glasses. The device 104 may also include a user interface, such as a display, a microphone, keypad, or other appropriate terminal equipment usable by the user 102.

The processor 110 is any electronic circuitry, including, but not limited to one or a combination of microprocessors, microcontrollers, application specific integrated circuits (ASIC), application specific instruction set processor (ASIP), and/or state machines, that communicatively couples to memory 112 and controls the operation of the device 104. The processor 110 may be 8-bit, 16-bit, 32-bit, 64-bit or of any other suitable architecture. The processor 110 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 110 may include other hardware that operates software to control and process information. The processor 110 executes software stored on the memory 112 to perform any of the functions described herein. The processor 110 controls the operation and administration of the device 104 by processing information (e.g., information received from the database 108, network 106, and memory 112). The processor 110 is not limited to a single processing device and may encompass multiple processing devices.

The memory 112 may store, either permanently or temporarily, data, operational software, or other information for the processor 110. The memory 112 may include any one or a combination of volatile or non-volatile local or remote devices suitable for storing information. For example, the memory 112 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 112, a disk, a CD, or a flash drive. In particular embodiments, the software may include an application 116 executable by the processor 110 to perform one or more of the functions described herein.

The network 106 is any suitable network operable to facilitate communication between the components of the system 100. The network 106 may include any interconnecting system capable of transmitting audio, video, signals, data, messages, or any combination of the preceding. The network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

The database 108 stores one or more models 130 of shoes that are available for purchase. In some embodiments, the database 108 stores three-dimensional (3D) models 130 of shoes. When the user 102 uses the device 104 to indicate that the user 102 would like to virtually try on a shoe, the device 104 communicates a query to the database 108 to retrieve the model 130 for that shoe. When the database 108 receives the query, the database 108 retrieves the model 130 of the desired shoe and communicates that model to the device 104 over the network 106. The device 104 may then process that model to simulate the look and fit of the shoe on the user's 102 foot.

The camera 114 captures an image or a series of images (e.g., a video) that is used or processed by the device 104. In some embodiments, the user 102 uses the device 104 to capture an image or a series of images of the user's 102 foot that is used for the virtual shoe try-on feature.

The device 104 executes an application 116 to implement one or more features of the device 104. For example, the application 116 may be a shopping application that the user 102 uses to shop for shoes online. The application 116 may also perform the virtual shoe try-on feature when instructed by the user 102. In some embodiments, the memory 112 stores the application 116, and the processor 110 executes the application 116 to perform one or more of the features or functions described herein.

In an example operation, the user 102 uses the device 104 to shop for shoes online. The user 102 may see a style of shoe that the user 102 likes, but the user 102 may not know what size shoe to purchase or how the shoe will look on the user's 102 foot. The user 102 may rely on the virtual shoe try-on feature to simulate the look and feel of the desired shoe on the user's 102 foot before purchasing the shoe.

When the user 102 indicates that the user 102 wants to use the virtual shoe try-on feature, the device 104 may request the user 102 use the device 104 to capture an image 118, or series of images 118 that form a video, of the user's 102 foot. The user 102 may use the camera 114 of the device 104 to capture the image 118 of the foot. For example, the user 102 may direct the camera 114 at the user's 102 foot to capture the image 118 of the user's 102 foot. The image 118 may be of the user's 102 foot in any suitable state. For example, the image 118 may show the user 102 wearing a shoe over the foot. As another example, the image 118 may show the user 102 wearing a sock over the foot. As yet another example, the image 118 may show an exposed or unclothed foot. The device 104 also communicates a query to the database 108 over the network 106. When the database 108 receives the query, the database 108 retrieves a 3D model 120 of the desired shoe, and communicates that model 120 to the device 104.

The device 104 applies a machine learning model 124 to the image 118 of the user's 102 foot to make predictions 126 of different aspects of the foot. The device 104 uses the predictions 126 and the 3D model 120 of the shoe to simulate the look and fit of the shoe on the user's 102 foot.

The device 104 uses the predictions 126 to generate a two-dimensional (2D) model 128 of the shoe from the 3D model 120 of the shoe. For example, the device 104 may rotate the 3D model 120 of the shoe to align the 3D model 120 of the shoe with the user's 102 foot in the image 118. As another example, the device 104 may resize or scale the 3D model 120 of the shoe so that the 3D model 120 of the shoe fits over the user's 102 foot shown in the image 118. As yet another example, the device 104 may remove portions of the 3D model 120 of the shoe that would be occluded by other objects in the image 118 (e.g., the user's 102 leg). The device 104 may then flatten the 3D model 120 of the shoe to generate the 2D model 128 of the shoe. As a result, the 2D model 128 of the shoe may be a projection of the 3D model 120 of the shoe onto a 2D plane. The device 104 then simulates the look and fit of the shoe on the user's 102 foot by superimposing the 2D model 128 of the shoe onto the user's 102 foot shown in the image 118. The device 104 then displays the image 118 with the superimposed 2D model 128 of the shoe so that the user 102 may see how the shoe would look and fit on the user's 102 foot. The user 102 may then make a more informed decision when purchasing the shoe.

It may be challenging for the device 104 to determine which portions of the 3D model 120 of the shoe should occlude the foot in the image 118 and which portions of the foot or leg in the image 118 should occlude the 3D model 120 of the shoe. If the occlusion is performed incorrectly, the foot in the image 118 may appear to be protruding out of the shoe or the shoe may appear to fit incorrectly on the foot.

To address this issue, the device 104 implements a segmentation feature that adds virtual objects to the 3D model 120 that act as masks for portions of the foot, ankle, or leg. For example, the device 104 may add a cylindrical virtual object inside the shoe to simulate an area occupied by a foot when the shoe is worn on the foot. As another example, the device 104 may add another cylindrical virtual object inside the shoe and by the heel to simulate an area occupied by an ankle when the shoe is worn. As yet another example, the device 104 may add a conical virtual object (e.g., a cone with its tip removed) that extends out of the shoe to simulate an area occupied by a leg when the shoe is worn. These virtual objects may be added such that the virtual objects do not intersect the 3D model 120.

After the machine learning model 124 predicts the image pixels for the foot or leg in the image 118, the device 104 determines the image pixels that intersect with the virtual objects added to the 3D model 120. The device 104 then considers these image pixel that intersect with one or more virtual objects as the set of image pixels that will occlude the 3D model 120 of the shoe. The device 104 may then remove, from the 3D model 120, the portions of the 3D model 120 that will be occluded by the set of image pixels. In this manner, the device 104 determines the portions of the 3D model 120 of the shoe that should be occluded by the foot or leg in the image 118, which improves the accuracy of the simulated look or fit. As a result, user satisfaction is improved, which reduces material waste caused by returns.

Figure 2:
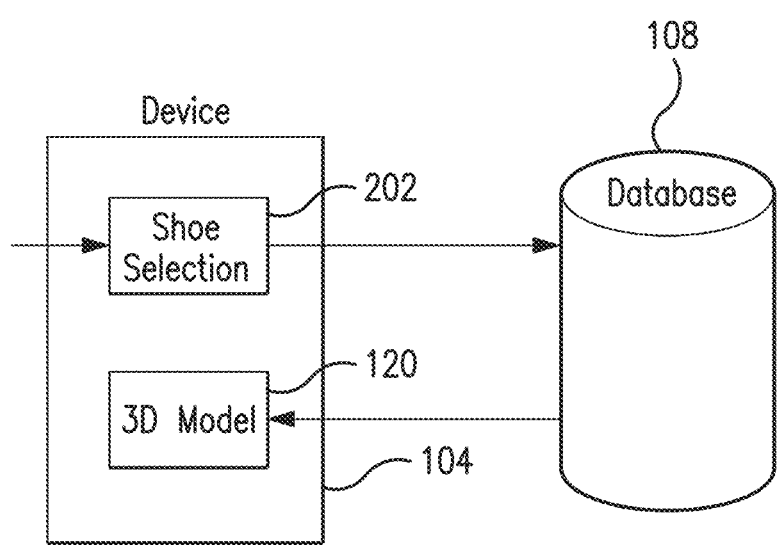
FIG. 2 illustrates an example device and database in the system of FIG. 1.

FIG. 2 illustrates an example device 104 and database 108 in the system 100 of FIG. 1. As seen in FIG. 2, the device 104 receives a shoe selection 202. For example, the device 104 may receive the shoe selection 202 when the user 102 selects a shoe that the user 102 wants to virtually try on. The device 104 may communicate the shoe selection 202 to the database 108. In some embodiments, the shoe selection 202 includes an identifier for the shoe that the user 102 desires. For example, the shoe selection 202 may include a name or model number of the desired shoe. The device 104 may communicate the shoe selection 202 to the database 108 as a query.

The database 108 uses the shoe selection 202 to query information stored in the database 108. Using the information in the shoe selection 202, the database 108 retrieves the 3D model 120 of the desired shoe, and communicates the 3D model 120 of the desired shoe to the device 104. The device 104 then processes the 3D model 120 of the shoe to simulate the look and fit of the shoe on the user's 102 foot.

Figure 3:
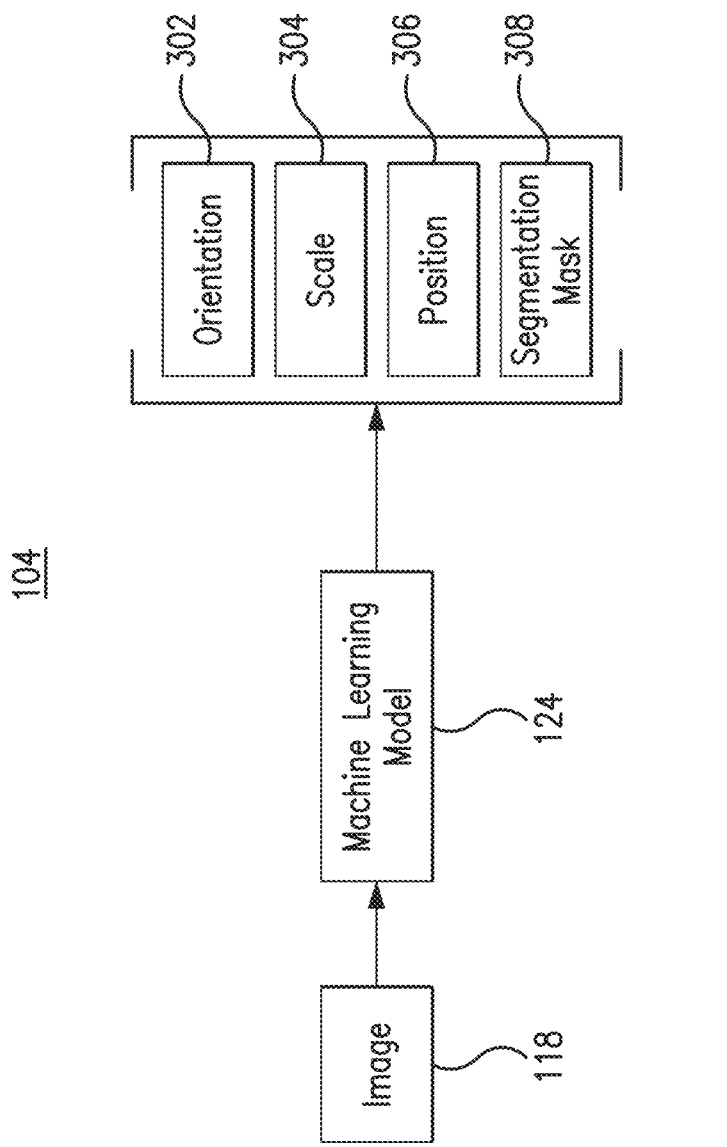
FIG. 3 illustrates an example device in the system of FIG. 1.

FIG. 3 illustrates an example device in the system of FIG. 1. As seen in FIG. 3, the device 104 uses the machine learning model 124 to predict certain features of the user's 102 foot in the image 118.

For example, the machine learning model 124 may predict an orientation 302 of the foot in the image 118. The machine learning model 124 may analyze portions of the boundary of the foot to predict an orientation of the foot in the image 118. The machine learning model 124 may analyze portions of the foot to determine if the foot is oriented at an angle relative to a particular axis in space in the image 118. For example, by analyzing a left and right boundary of the foot in the image 118, the machine learning model 124 may generate the prediction that the foot is turned towards the left or the right in the image 118.

As another example, the machine learning model 124 may predict a scale 304 to use in adjusting the size of the 3D model 120 so that the 3D model 120 of the shoe fits onto the foot in the image 118. For example, the machine learning model 124 may determine one or more keypoints on the foot in the image 118 by analyzing the boundary of the user's 102 foot to predict coordinates of key or important portions of the user's 102 foot. The machine learning model 124 may predict the coordinates of each of the user's 102 toes and coordinates for the user's 102 heel and ankle. As another example, the machine learning model 124 may determine the boundaries of the foot in the image 118 represented by a bounding box. The machine learning model 124 may then determine the scale 304 that should be used to adjust the size of the 3D model 120 so that the shoe fits around the predicted keypoints or the predicted bounding box.

As another example, the machine learning model may predict a position 306 of objects (e.g., a foot or a leg) in the image 118. The position 306 may include coordinates that are used to determine how to position or translate the 3D model 120 such that the shoe is positioned properly on the foot. In some embodiments, the position 306 may include a translation matrix or vector that, when applied to the 3D model 120, adjusts the position of the 3D model 120 such that the 3D model is positioned over the foot in the image 118.

As another example, the machine learning model 124 may predict portions of the foot and leg in the image 118. The machine learning model 124 generates a segmentation mask 308 that indicates the image pixels for the foot and the leg in the image 118. In some embodiments, the segmentation mask 308 also indicates the image pixels for garments (e.g., pants, skirt, dress, shorts, etc.) in the image 118. The machine learning model 124 may analyze the image 118 to predict which image pixels show a portion of the foot, a portion of the leg, or a portion of garments. The device 104 may use this segmentation mask 308 later to determine which portions of the 3D model 120 should be removed.

Figure 4:
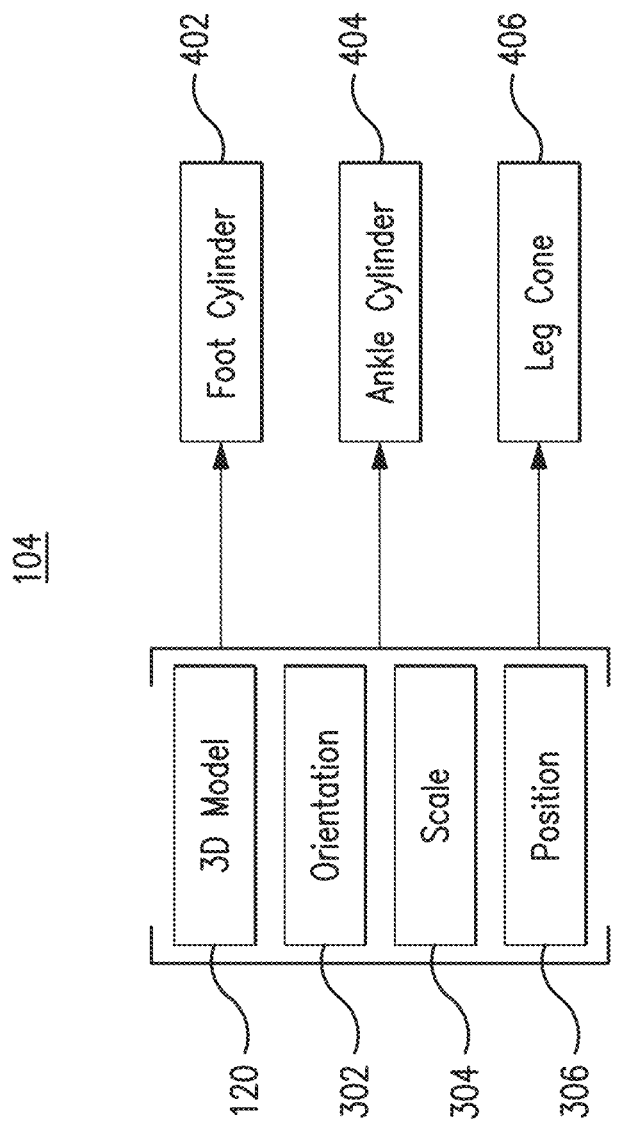
FIG. 4 illustrates an example device in the system of FIG. 1.

FIG. 4 illustrates an example device 104 in the system 100 of FIG. 1. Generally, the device 104 adds one or more virtual objects to the 3D model 120. The virtual objects may simulate or represent different portions of a foot or leg when the shoe in the 3D model 120 is being worn. In the example of FIG. 4, the device 104 adds a foot cylinder 402, an ankle cylinder 404, and a leg cone 406 to the 3D model 120. The foot cylinder 402 may be positioned within the shoe in the 3D model 120 to represent a foot in the shoe. The ankle cylinder 404 may be positioned within the shoe in the 3D model 120 to represent an ankle or a heel in the shoe. The leg cone 406 may be positioned such that the leg cone 406 extends out of the 3D model 120. The leg cone 406 may cover a volume that may be occupied by the range of motion of a leg when the shoe in the 3D model 120 is worn.

The device 104 uses one or more of the predicted orientation 302, scale 304, and position 306 to adjust the foot cylinder 402, ankle cylinder 404, and leg cone 406. For example, the device 104 may use the predicted orientation 302 to rotate the arrangement of the foot cylinder 402, ankle cylinder 404, and leg cone 406 such that the foot cylinder 402, ankle cylinder 404, and leg cone 406 are properly positioned relative to the 3D model 120 (e.g., when the 3D model 120 moves as a result of the user 102 moving the foot or leg). The foot cylinder 402 may be positioned within the 3D model 120 such that the foot cylinder 402 is positioned within the shoe and extends along the length of the shoe. The ankle cylinder 404 may be positioned within the shoe near the heel of the shoe. The leg cone 406 may be positioned such that the leg cone 406 extends upwards and out of the shoe.

The device 104 may use the scale 304 to adjust the sizes of the foot cylinder 402, ankle cylinder 404, and leg cone 406. For example, the device 104 may use the scale 304 to adjust the sizes such that the foot cylinder 402, ankle cylinder 404, and leg cone 406 fit within the 3D model 120 of the shoe. In some embodiments, the foot cylinder 402, ankle cylinder 404, and leg cone 406 may be sized so that the foot cylinder 402, ankle cylinder 404, and leg cone 406 do not intersect with the 3D model 120 of the shoe. Rather, the foot cylinder 402 and ankle cylinder 404 may fit within the 3D model 120 of the shoe, and the leg cone 406 may extend upwards and out of the 3D model 120 of the shoe.

The device 104 may also use the predicted position 306 to move or translate the foot cylinder 402, ankle cylinder 404, and leg cone 406 such that the foot cylinder 402, ankle cylinder 404, and leg cone 406 move or translate with the 3D model 120 of the shoe. As a result, the foot cylinder 402, ankle cylinder 404, and leg cone 406 may maintain their position relative to the 3D model 120 of the shoe. The foot cylinder 402 and ankle cylinder 404 may remain within the 3D model 120 of the shoe, and the leg cone 406 may continue to extend upwards and out of the 3D model 120 of the shoe.

Figure 5:
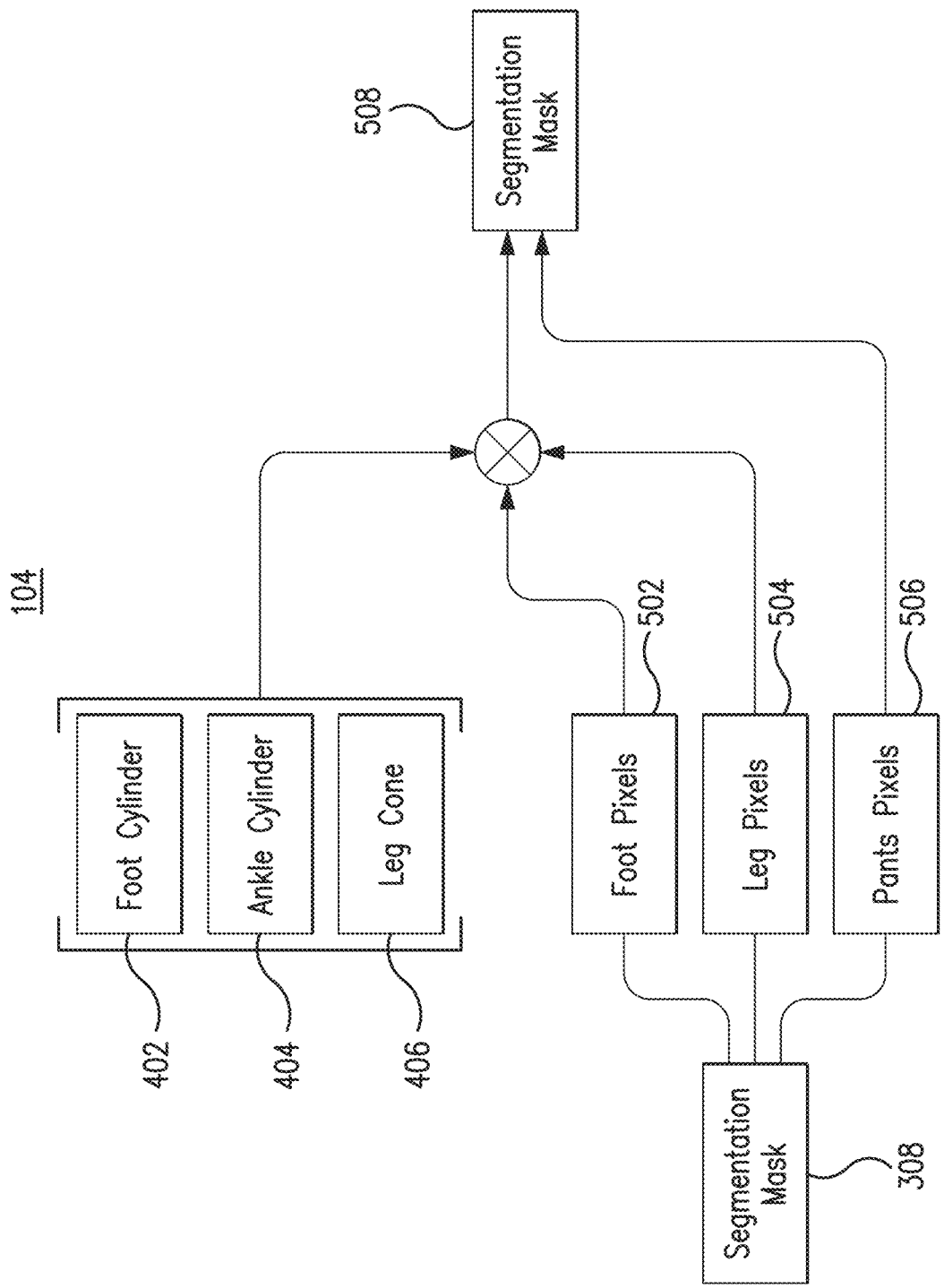
FIG. 5 illustrates an example device in the system of FIG. 1.

FIG. 5 illustrates an example device 104 in the system 100 of FIG. 1. Generally, the device 104 uses the foot cylinder 402, ankle cylinder 404, and leg cone 406, to determine which portions of the 3D model 120 of the shoe should be removed. The device 104 may determine which portions of the 3D model 120 to remove by performing certain operations with the foot cylinder 402, ankle cylinder 404, leg cone 406, and the segmentation mask 308.

As discussed previously, the segmentation mask 308 indicates image pixels that form the foot, leg, or garments shown in an image. The subsequent examples will use a pair of pants as the garments, but the segmentation mask 308 may indicate image pixels for any suitable garments (e.g., skirts, dresses, shorts, etc.). In some embodiments, the device 104 does not consider socks as garments for the purposes of forming the segmentation mask 308. As seen in FIG. 5, the segmentation mask 308 indicates foot pixels 502, leg pixels 504, and pants pixels 506. The foot pixels 502 belong to a foot in the image. The leg pixels 504 belong to a leg in the image. The pants pixels 506 belong to portions of a pair of pants in the image. If the image does not show portions of pants, then the segmentation mask 308 may not indicate the pants pixels 506.

The device 104 determines the pixels of the foot pixels 502 and the leg pixels 504 that intersect with one or more of the foot cylinder 402, ankle cylinder 404, and leg cone 406. The device 104 identifies the intersecting pixels and generates a segmentation mask 508 that identifies these intersecting pixels. For example, after rotating, scaling, and positioning the foot cylinder 402, ankle cylinder 404, and leg cone 406, the device 104 may overlay the foot pixels 502 and leg pixels 504 over the foot cylinder 402, ankle cylinder 404, and leg cone 406. The device 104 may then identify the pixels of the foot pixels 4502 and leg pixels 504 that intersect the foot cylinder 402, ankle cylinder 404, or leg cone 406. The device 104 then adds these intersecting pixels to the segmentation mask 508. As a result the segmentation mask 508 identifies the pixels of the foot and the leg that should occlude portions of the 3D model of the shoe.

In certain embodiments, the device 104 also adds the pants pixels 506 to the segmentation mask 508. In this manner, the segmentation mask 508 also indicates that the pants pixels 506 should always occlude portions of the 3D model of the shoe and the foot and the leg in the image.

Figure 6:
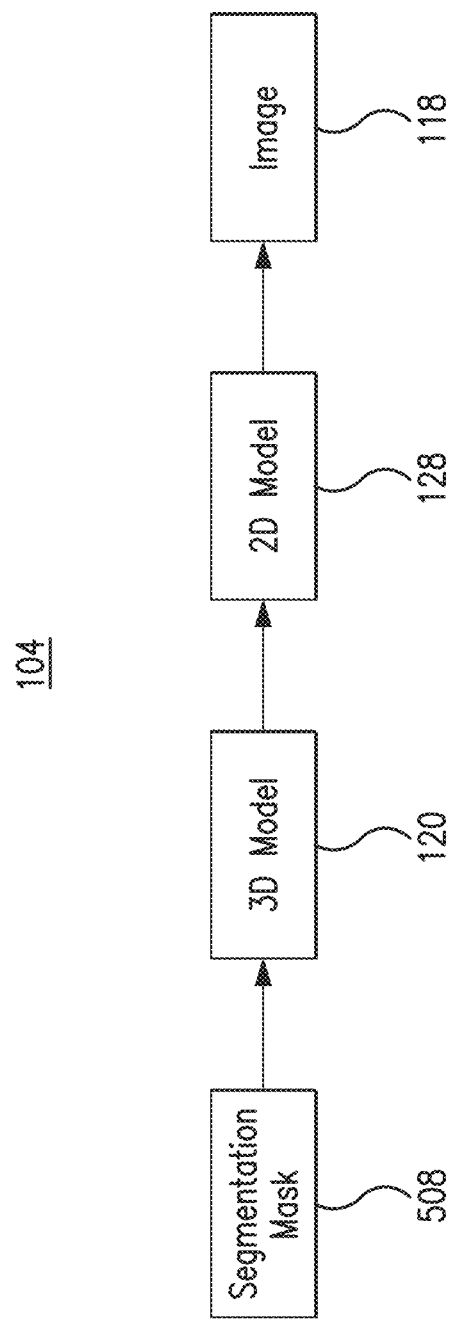
FIG. 6 illustrates an example device in the system of FIG. 1.

FIG. 6 illustrates an example device 104 in the system 100 of FIG. 1. As seen in FIG. 6, the device 104 uses the segmentation mask 508 to identify portions of the 3D model 120 that should be removed from the 3D model 120. As discussed previously, the segmentation mask 508 identifies pixels of the foot, leg, or pants that should occlude intersecting portions of the 3D model 120. The device 104 may overlay the segmentation mask 508 onto the 3D model 120 to identify the portions of the 3D model 120 that intersect with the segmentation mask 508. The device 104 may then remove from the 3D model 120 the portions of the 3D model 120 that intersect with the segmentation mask 508.

After removing portions from the 3D model 120, the device 104 generates the 2D model 128 from the 3D model 120. For example, the device 104 may flatten the 3D model 120 to generate the 2D model 128. As a result, the 2D model 128 is a projection of the 3D model 120 onto a 2D plane. The device 104 then superimposes the 2D model 128 onto the image 118 to simulate the look and fit of the shoe on the foot in the image 118. In certain embodiments, because the device 104 has removed portions of the 3D model 120 using the segmentation mask 508, the simulated look and fit of the 2D model 128 is improved.

Figure 7:
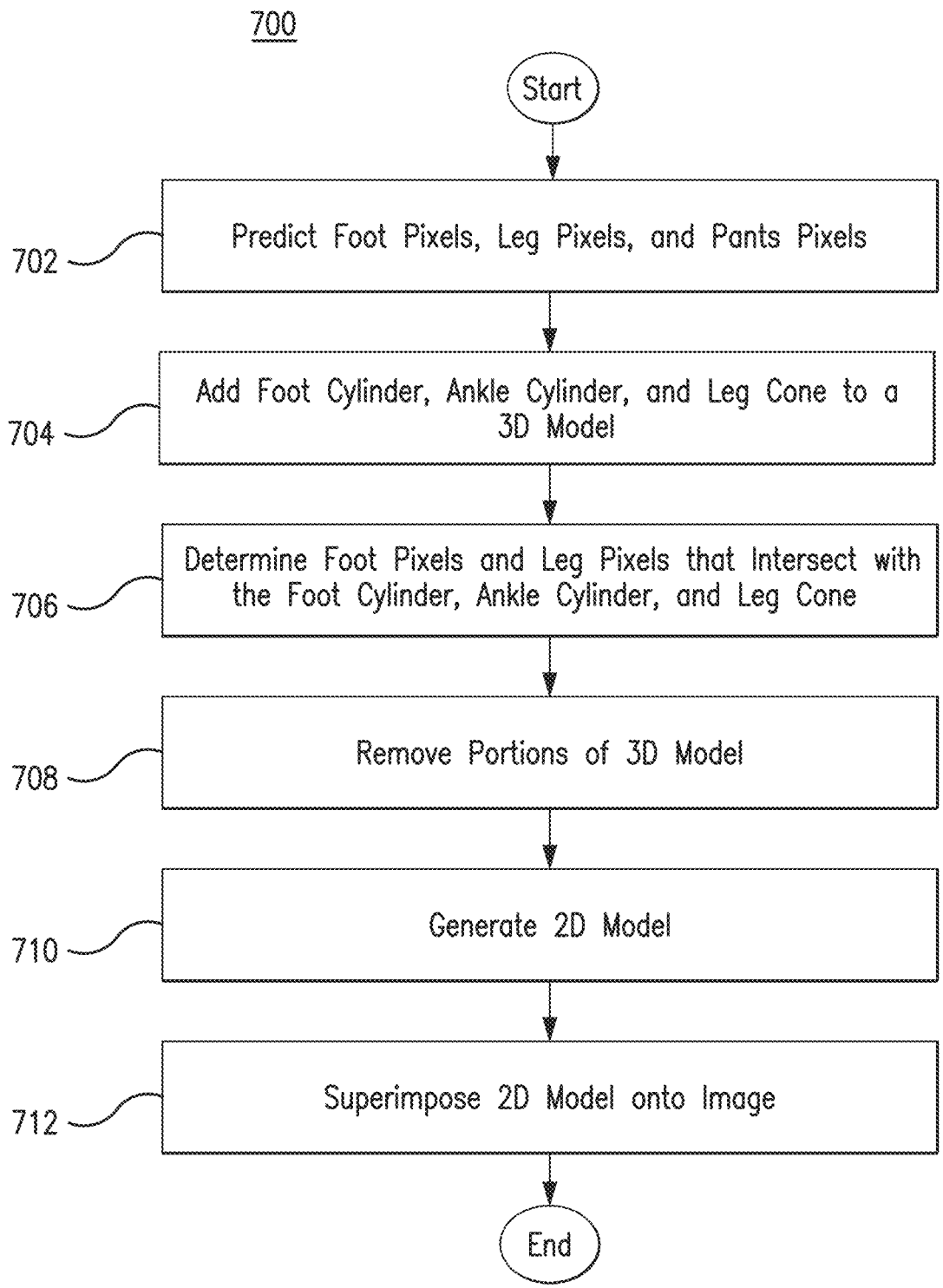
FIG. 7 is a flowchart of an example method performed in the system of FIG. 1.

FIG. 7 is a flowchart of an example method 700 performed in the system 100 of FIG. 1. In particular embodiments, the device 104 performs the method 700. By performing the method 700, the device 104 removes portions of a 3D model 120 of a shoe that will be occluded by a foot, a leg, or pants in an image 118.

In block 702, the device 104 predicts foot pixels 502, leg pixels 504, and garment pixels. The following example will use pants pixels 506 as the garment pixels. The device 104 may apply a machine learning model 124 to an image 118 to predict the image pixels that show the foot, the leg, or pants. The machine learning model 124 may analyze the pixels in the image 118 and determine which of the pixels belong to the foot, the leg, or the pants. The device 104 may form a segmentation mask 308 that indicates the foot pixels 502, the leg pixels 504, and the pants pixels 506.

In block 704, the device 104 adds a foot cylinder 402, an ankle cylinder 404, and a leg cone 406 to a 3D model 120 of a shoe. The device 104 may have retrieved the 3D model 120 of the shoe from a database 108 in response to a user request to virtually try on the shoe. After retrieving the 3D model 120 of the shoe, the device 104 may add the foot cylinder 402, ankle cylinder 404, and leg cone 406 to the 3D model 120 of the shoe. In some embodiments, the device 104 adds only one or more of the foot cylinder 402, ankle cylinder 404, and leg cone 406 to the 3D model 120 of the shoe depending on the type of shoe shown in the 3D model 120.

The device 104 may perform operations on the foot cylinder 402, ankle cylinder 404, and leg cone 406 when adding the foot cylinder 402, ankle cylinder 404, and leg cone 406 to the 3D model 120 of the shoe. For example, the device 104 may have used the machine learning model 124 to analyze the image 118 to predict an orientation 302, scale 304, and position 306 to be applied to the 3D model 120 of the shoe, so that the 3D model 120 of the shoe is positioned properly over the foot in the image 118 and such that the 3D model 120 of the shoe fits properly on the foot in the image 118. The device 104 may use the predicted orientation 302, scale 304, and position 306 to adjust the orientation, sizes, and positions of the foot cylinder 402, ankle cylinder 404, and leg cone 406. By adjusting the orientation and position of the foot cylinder 402, ankle cylinder 404, and leg cone 406, the device 104 maintains the orientation and position of the foot cylinder 402, ankle cylinder 404, and leg cone 406 relative to the 3D model 120. By adjusting the sizes of the foot cylinder 402, ankle cylinder 404, and leg cone 406 according to the predicted scale 304, the foot cylinder 402, ankle cylinder 404, and leg cone 406 fit within the 3D model 120 of the shoe, without intersecting with the 3D model 120 of the shoe.

In block 706, the device 104 determines foot pixels 502 and leg pixels 504 that intersect with the foot cylinder 402, ankle cylinder 404, and leg cone 406. The device 104 may overlay the segmentation mask 308 over the 3D model 120 of the shoe along with the foot cylinder 402, ankle cylinder 404, and leg cone 406. As discussed previously, the segmentation mask 308 identifies the foot pixels 502 and leg pixels 504. The device 104 then identifies the pixels of the foot pixels 502 and leg pixels 504 that intersect with one or more of the foot cylinder 402, ankle cylinder 404, and leg cone 406. The device 104 then adds these intersecting pixels to a segmentation mask 508. In some embodiments, the device 104 also adds the pants pixels 506 indicated by the segmentation mask 308 to the segmentation mask 508.

In block 708, the device 104 removes portions of the 3D model 120 of the shoe. The device 104 may overlay the segmentation mask 508 on the 3D model 120 of the shoe. The device 104 identifies the portions of the 3D model 120 that intersect with the pixels indicated by the segmentation mask 508. The device 104 then removes these intersecting portions from the 3D model 120 of the shoe. In block 710, the device 104 generates the 2D model 128 of the shoe using the 3D model 120 of the shoe. The device 104 flattens the 3D model 120 to generate the 2D model 128. As a result, the 2D model 128 is a projection of the 3D model 120 onto a 2D plane. In block 712, the device 104 superimposes the 2D model 128 onto the image 118. In this manner, the device 104 simulates the look and fit of the shoe on a foot, which may improve user satisfaction and reduce waste caused by returns.

In embodiments where the image 118 is part of a series of images 118 or frames of a video, the user 102 may move the foot or leg and cause the foot or leg to change orientation, size, or position between frames of the video. The device 104 may perform each of the steps 702, 706, 708, 710, and 712 for each image 118 or frame of the video. Stated differently, the device 104 may add the foot cylinder 402, ankle cylinder 404, and leg cone 406 only once for the 3D model 120. For subsequent images 118 or frames of the video, the device 104 may adjust the orientations, sizes, or positions of the foot cylinder 402, ankle cylinder 404, and leg cone 406 using the predicted orientations 302, scales 304, and positions 306 for the subsequent images 118 or frames of the video.

Figure 8:
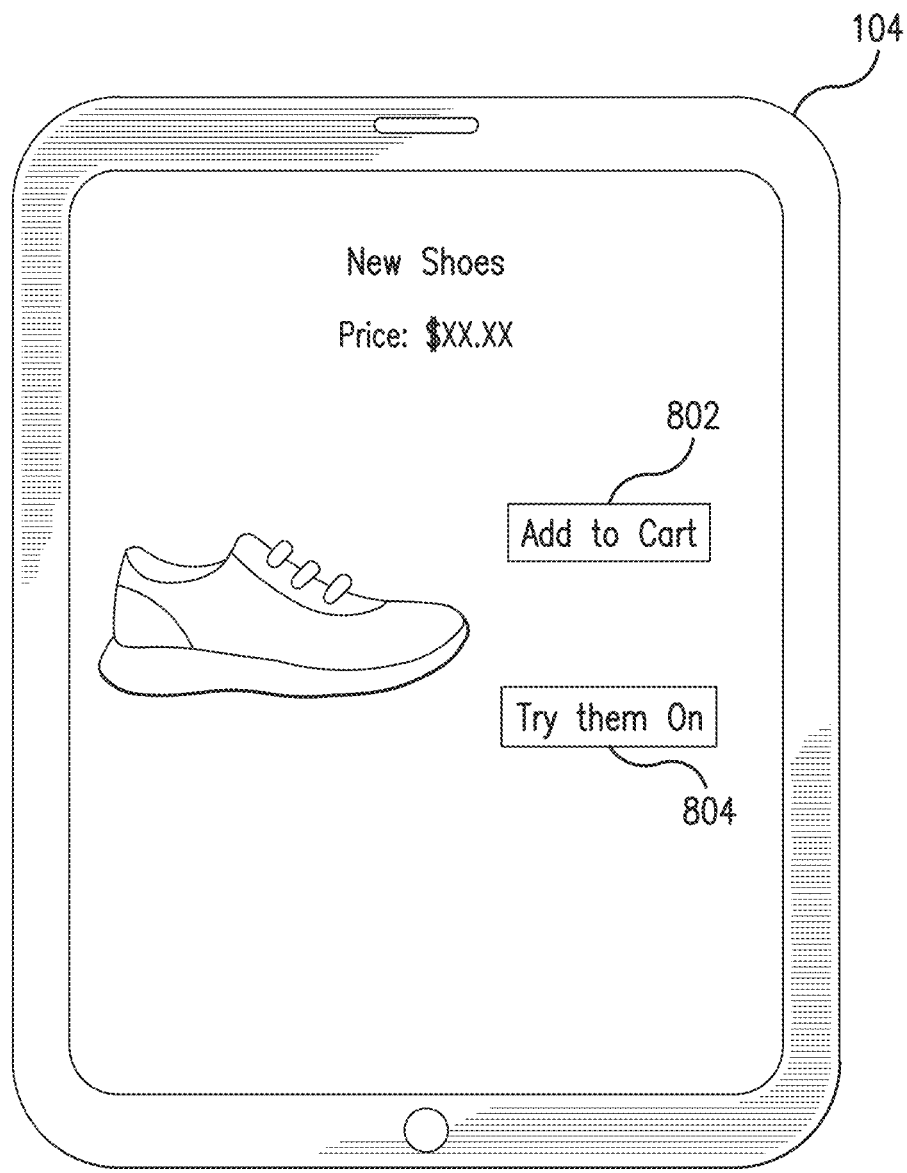
FIG. 8 illustrates an example device in the system of FIG. 1.

FIG. 8 illustrates an example device 104 in the system 100 of FIG. 1. As seen in FIG. 8, the device 104 is being used to shop for shoes online. The device 104 shows a product listing for a shoe. The listing includes an image of the shoe along with a price for the shoe. Additionally, the device 104 presents a button 802 and a button 804. If the button 802 is activated or pressed by a user 102, the device 104 communicates a message requesting that the shoe be added to a virtual shopping cart of the user 102. The user 102 may then checkout and purchase the shoe.

If the user 102 activates or presses the button 804, the device 104 may begin the virtual shoe try-on process to simulate the look and fit of the shoe on the user's 102 foot. By providing this feature, the device 104 allows the user 102 to see how the shoe looks on the user's 102 foot before the user 102 commits to purchasing the shoe. In this manner, the device 104 reduces the likelihood that the user 102 will be dissatisfied with the shoe purchase and the likelihood that the user 102 will return the shoe. As a result, the device 104 improves the satisfaction of the user 102 and conserves shipping resources, such as packaging materials and fuel, in particular embodiments.

Figure 9:
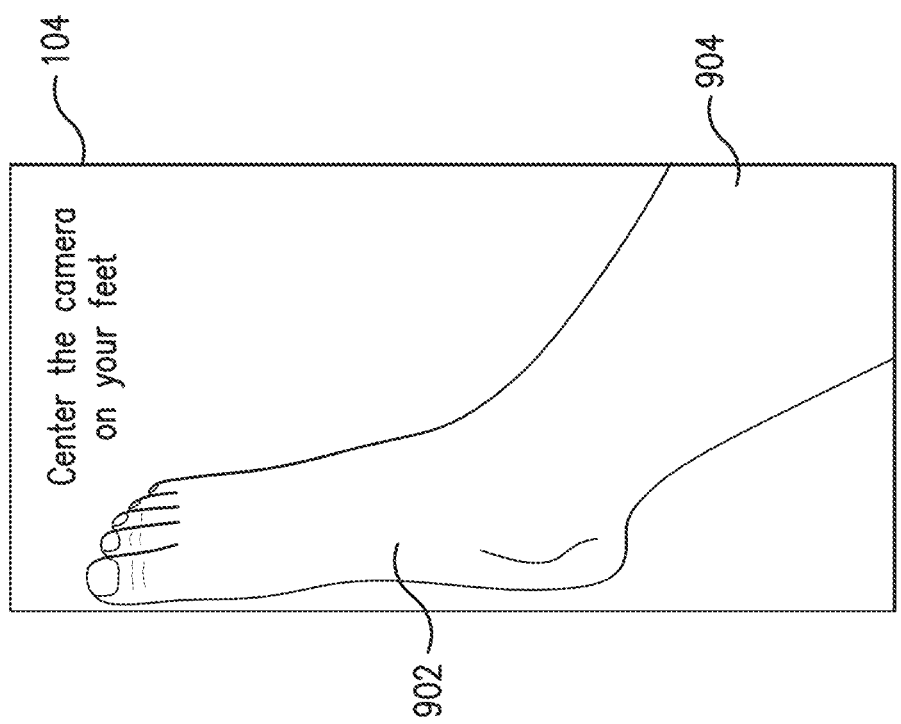
FIG. 9 illustrates an example device in the system of FIG. 1.

FIG. 9 illustrates an example device 104 in the system 100 of FIG. 1. As seen in FIG. 9, the device 104 requests that the user 102 take a picture of the user's 102 foot after the user 102 presses or activates the button 804 to begin the virtual shoe try-on process. The image captured by the user 102 includes the user's foot 902 and a portion of the user's leg 904. In some embodiments, after the user 102 presses or activates the button 804 to begin the virtual shoe try-on feature, the device 104 communicates a message to the database 108 to retrieve a 3D model 120 of the shoe in the product listing. The database 108 retrieves the 3D model 120 of the shoe and communicates the 3D model 120 of the shoe to the device 104. The device 104 then uses the 3D model 120 of the shoe for the virtual try-on process.

Figure 10:
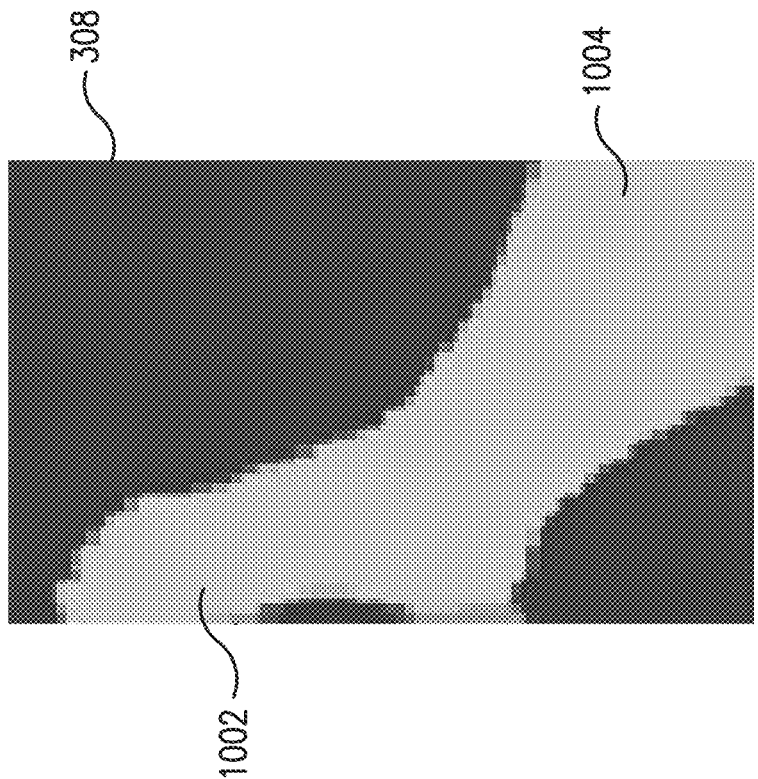
FIG. 10 illustrates an example segmentation mask in the system of FIG. 1.

FIG. 10 illustrates an example segmentation mask 308 in the system 100 of FIG. 1. The device 104 may have generated the segmentation mask 308 based on the foot 902 and leg 904 captured by the device 104 in FIG. 9. The device 104 may apply a machine learning model to the image of the foot 902 and the leg 904. The machine learning model may identify the pixels 1002 that form the foot 902 and the pixels 1004 that form the leg. The device 104 may later use these pixels 1002 and 1004 to determine which portions of a 3D model of a shoe should be occluded.

Figure 11:
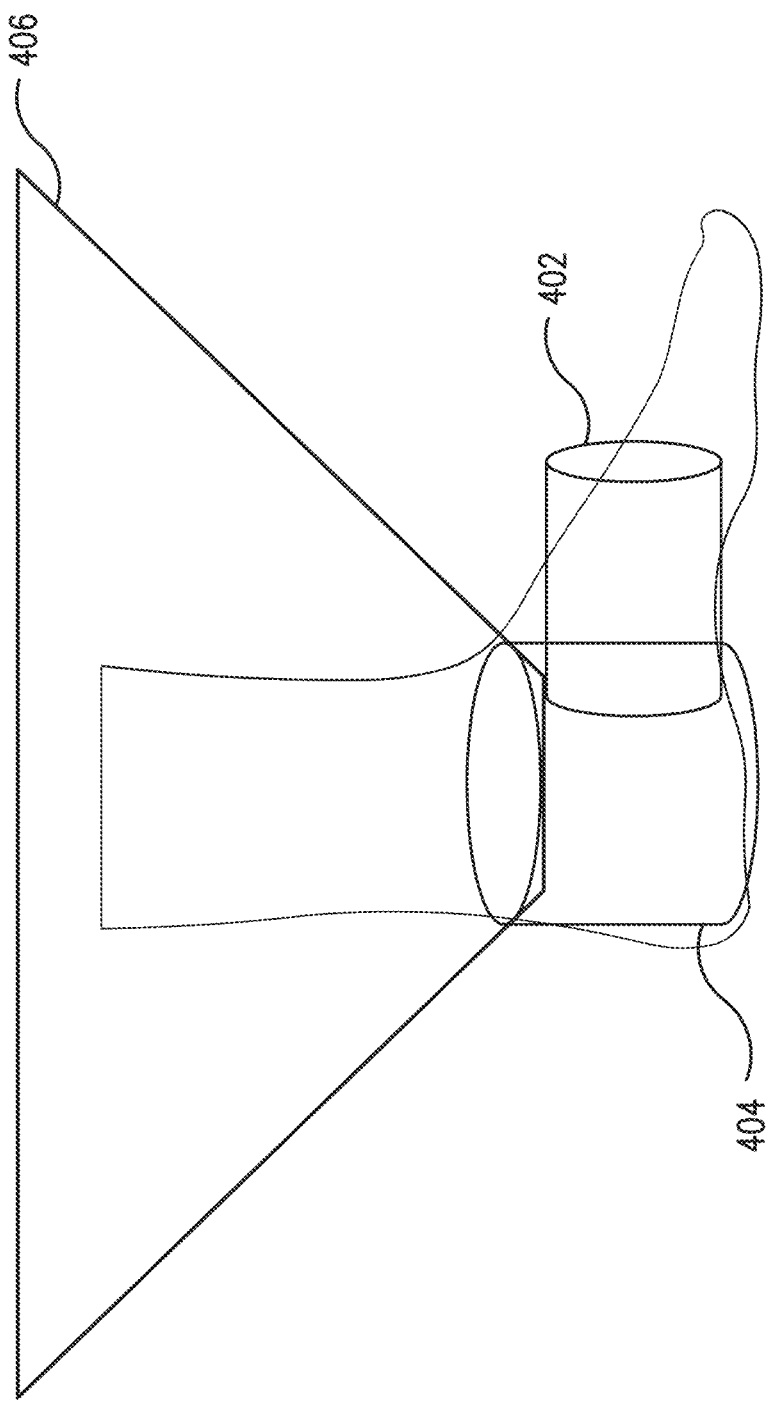
FIG. 11 illustrates example virtual shapes in the system of FIG. 1.

FIG. 11 illustrates example virtual objects in the system 100 of FIG. 1. As seen in FIG. 11, the virtual objects include a foot cylinder 402, an ankle cylinder 404, and a leg cone 406. The foot cylinder 402 represents a portion of a foot along a length of the foot. The ankle cylinder 404 represents a heel or ankle region of the foot. The leg cone 406 is a volume that represents the range of motion of the leg. As seen in FIG. 11, the leg cone 406 may not be a complete or symmetrical cone. Rather, the leg cone 406 may have a portion removed from the tip of the cone (e.g., the leg cone 406 may have a flat top/bottom rather than a pointed top/bottom). Additionally, the leg cone 406 may extend further forwards than backwards, or vice versa.

As seen in FIG. 11, portions of the leg cone 406 may intersect with portions of the ankle cylinder 404, and portions of the ankle cylinder 404 may intersect with portions of the foot cylinder 402. These intersections may prevent small gaps to form between the virtual objects. If these small gaps were to form, the small gaps may cause small portions of the 3D model 120 to not be removed when those small portions should be removed due to occlusions with the foot or leg. As a result, the intersections provide a more accurate simulation of the look and fit of a shoe on the foot, in certain embodiments.

Figure 12:
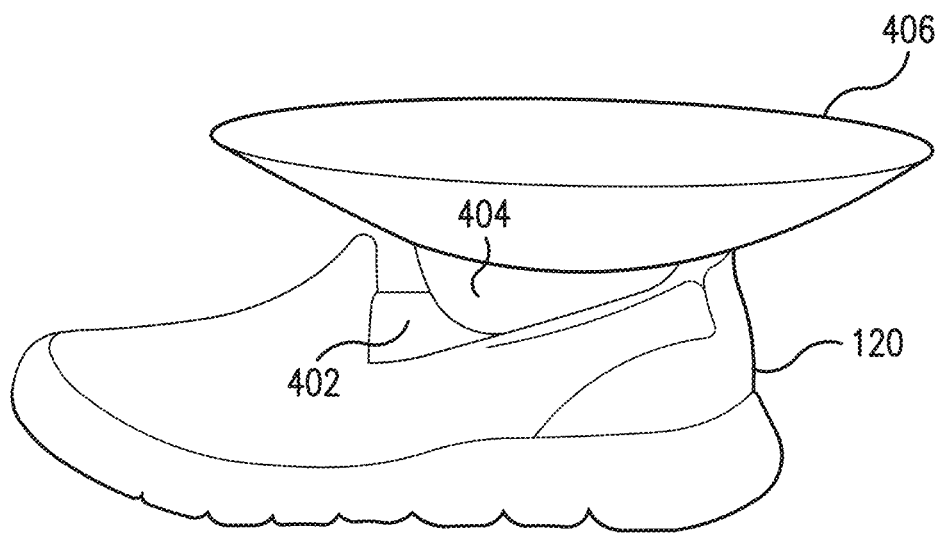
FIG. 12 illustrates example virtual shapes in the system of FIG. 1.

FIG. 12 illustrates example virtual shapes in the system 100 of FIG. 1. As seen in FIG. 12, the device 104 has added the foot cylinder 402, ankle cylinder 404, and leg cone 406 to a 3D model 120 of a shoe. The foot cylinder 402 is positioned within the shoe and extends along the length of the shoe. The ankle cylinder 404 is positioned within the shoe and near the back heel of the shoe. The leg cone 406 is positioned such that the leg cone 406 extends upwards and out of the shoe. The foot cylinder 402, ankle cylinder 404, and leg cone 406 may be sized and positioned such that the foot cylinder 402, ankle cylinder 404, and leg cone 406 do not intersect with the 3D model 120 of the shoe.

Figure 13:
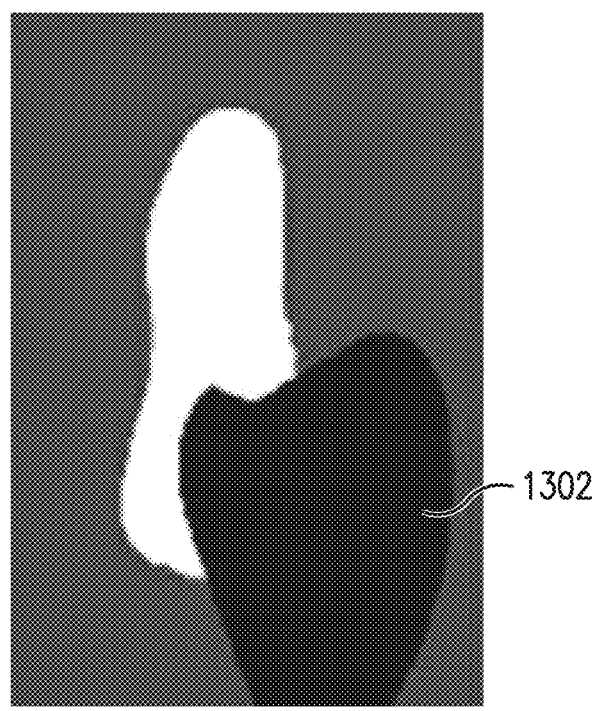
FIG. 13 illustrates an example virtual shape in the system of FIG. 1.

FIG. 13 illustrates an example virtual shape 1302 in the system 100 of FIG. 1. As seen in FIG. 13, the virtual shape 1302 is the union of a foot cylinder, ankle cylinder, and leg cone. The virtual shape 1302 is a volume that represents a foot, ankle, heel, or leg when the shoe is worn. The device 104 may use the virtual shape 1302 to determine which portions of the 3D model 120 of the shoe should be occluded.

FIG. 14 illustrates an example generation of a segmentation mask 508 in the system 100 of FIG. 1. As seen in FIG. 14, the device 104 begins by finding the intersection between the pixels in the segmentation mask 308 and the virtual shape 1302. The device 104 may overlay the segmentation mask 308 over the virtual shape 1302 to determine which pixels in the segmentation mask 308 intersect with the virtual shape 1302. The device then adds the intersecting pixels to the segmentation mask 508. As a result, the segmentation mask 508 identifies the pixels in the segmentation mask 308 that intersect with the virtual shape 1302.

After generating the segmentation mask 508, the device 104 may overlay the segmentation mask 508 onto the 3D model 120 of the shoe. The device 104 may then identify portions of the 3D model 120 of the shoe that intersect with the pixels indicated by the segmentation mask 508. The device 104 removes from the 3D model 120 of the shoe the portions that intersect with the pixels. The device 104 then flattens the 3D model 120 to generate a 2D model 128 of the shoe. The device 104 superimposes the 2D model 128 of the shoe onto the image 118 to simulate the look and fit of the shoe on the foot.

Figure 15:
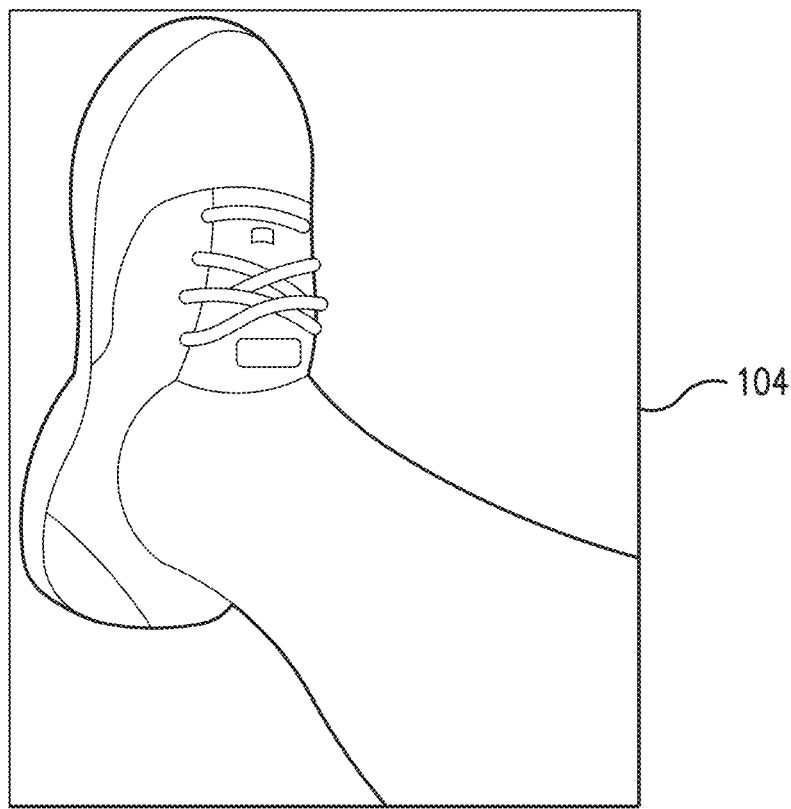
FIG. 15 illustrates an example device in the system of FIG. 1.

FIG. 15 illustrates an example device 104 in the system 100 of FIG. 1. As seen in FIG. 15, the device 104 has processed the image of the user's foot and the 3D model of the shoe. The device 104 has generated a 2D model of the shoe and superimposed the 2D model of the shoe onto the image of the user's foot. The device 104 then presents an image showing the 2D model of the shoe superimposed onto the user's foot. In some embodiments, the image is a real-time image of the foot, and the device 104 superimposes the 2D model of the shoe onto the real-time image of the foot. When the user views the device 104, the user sees how the shoe looks and fits on the user's foot. The user may then evaluate whether the user wants to purchase the shoe.

Figure 16:
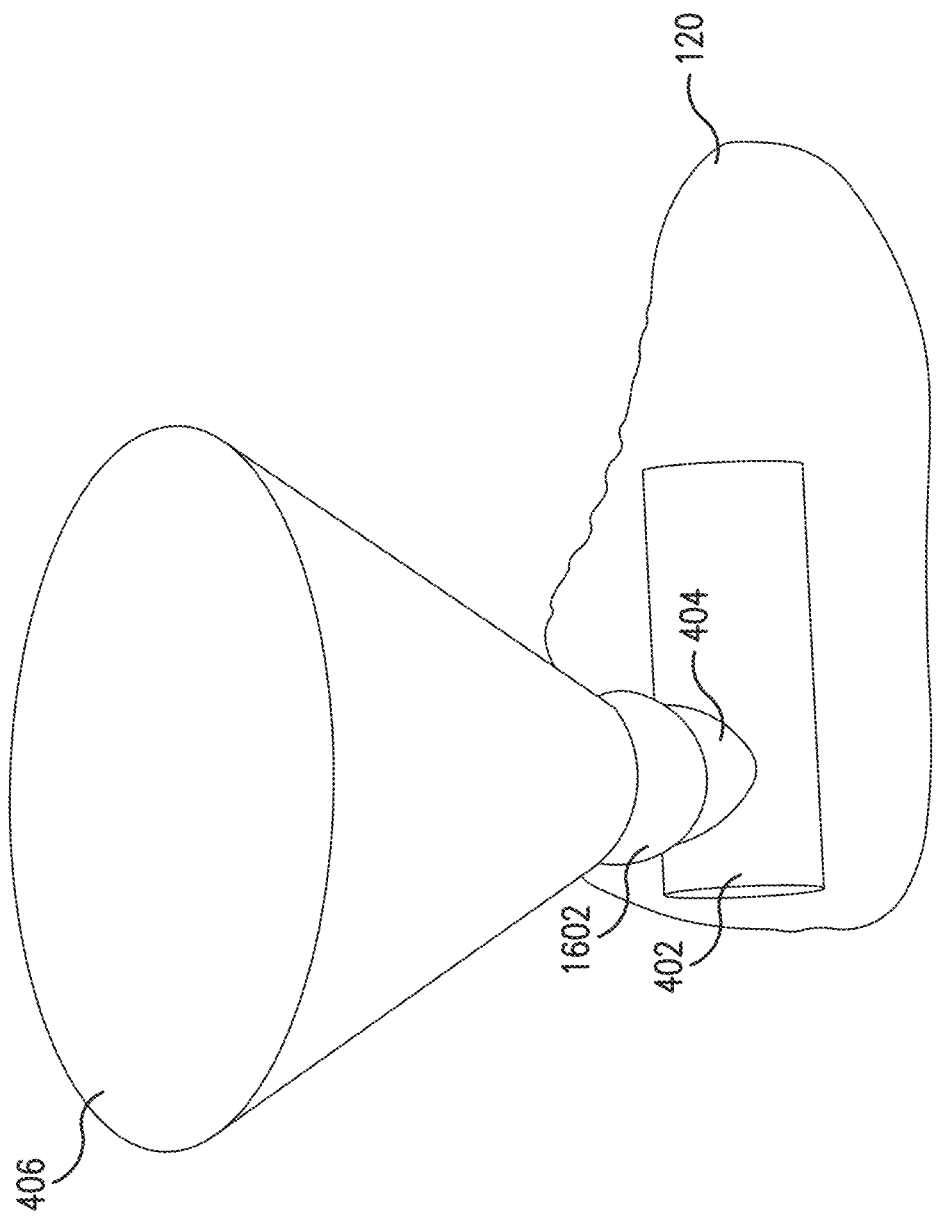
FIG. 16 illustrates example virtual shapes in the system of FIG. 1.

The system 100 may add any suitable virtual object to the 3D model of the shoe. FIG. 16 illustrates example virtual objects in the system 100 of FIG. 1. As seen in FIG. 16, a foot cylinder 402, ankle cylinder 404, and leg cone 406 have been added to the 3D model 120 of the shoe. Additionally, a virtual spherical object 1602 is also added to the 3D model 120. The virtual spherical object 1602 is positioned between the ankle cylinder 404 and the leg cone 406. The virtual spherical object may intersect with one or both of the ankle cylinder 404 and the leg cone 406. The virtual spherical object 1602 may provide a better approximation of the shape of the ankle region of a user 102. As with previous embodiments, the device 104 may add the virtual spherical object 1602 to the 3D model 120 using the predicted orientation 302, scale 304, and position 306. The device 104 may then form a segmentation mask 508 by finding the intersection of the foot pixels 502 and leg pixels 504 with the foot cylinder 402, ankle cylinder 404, leg cone 406, and virtual spherical object 1602. The device 104 then removes portions of the 3D model 120 that intersect with the segmentation mask 508 and flattens the 3D model 120 to form the 2D model 128. The device 104 superimposes the 2D model 128 onto an image 118 of a foot to simulate the look and fit of the shoe on the foot.

In summary, the device 104 determines which portions of a 3D model 120 of a shoe should be occluded. The device 104 uses machine learning to analyze an image 118 of a foot to make predictions about the foot (e.g., an orientation, scale, and position). The device 104 also predicts a segmentation mask 308 that indicates the image pixels for the foot, leg, or pants shown in the image 118. The device 104 retrieves the 3D model 120 of a desired shoe and adds, to the 3D model 120, various virtual objects. For example, the device 104 may add one or more cylindrical objects inside the 3D model 120 of the shoe to simulate a foot or an ankle. As another example, the device 104 may add a conical object that extends out of the 3D model 120 of the shoe to simulate the range of motion of a leg. The device 104 then takes the intersection of the segmentation mask 308 (e.g., the pixels for the foot and the leg in the image) and the virtual objects to generate a second segmentation mask 508. The device 104 removes portions of the 3D model 120 of the shoe that intersect with the second segmentation mask 508. After removing these portions, the device 104 generates the 2D model 128 of the shoe using the 3D model 120 of the shoe. The device 104 then superimposes the 2D model 128 onto the image 118 to simulate the look and fit of the shoe on the foot. In this manner, the device 104 improves the accuracy and realistic look of the simulation, in certain embodiments.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present disclosure describes a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments may be devised without departing from the basic scope thereof, and the scope thereof is determined by the claims that follow.

What is claimed is:

1. A method for fitting a virtual shoe onto a foot, the method comprising:
   predicting, using a machine learning model, a first plurality of pixels comprising pixels of an image corresponding to a foot and a leg in the image;
   adding a first virtual cylindrical object and a virtual conical object to a three-dimensional model of a shoe such that a portion of the first virtual cylindrical object is positioned within the three-dimensional model of the shoe such that a height of the first virtual cylindrical object extends along a sole of the three-dimensional model of the shoe, and such that the virtual conical object extends out of the three-dimensional model of the shoe;

determining a set of pixels comprising pixels of the first plurality of pixels that intersect with the first virtual cylindrical object or the virtual conical object;

removing, from the three-dimensional model of the shoe, a first portion of the three-dimensional model of the shoe that intersects with the set of pixels;

generating a two-dimensional model of the shoe from the three-dimensional model of the shoe after removing the first portion from the three-dimensional model of the shoe; and superimposing the two-dimensional model of the shoe onto the image.

2. The method of claim 1, further comprising adding a second virtual cylindrical object to the three-dimensional model of the shoe such that a portion of the second virtual cylindrical object is positioned within the three-dimensional model of the shoe, wherein the set of pixels further comprises a pixel of the first plurality of pixels that intersects with the second virtual cylindrical object.

3. The method of claim 1, further comprising predicting, using the machine learning model, a scale and a position of the foot in the image, wherein adding the first virtual cylindrical object and the virtual conical object to the three-dimensional model of the shoe comprises scaling and positioning the first virtual cylindrical object and the virtual conical object based on the scale and the position of the foot in the image.

4. The method of claim 1, further comprising:
predicting, using the machine learning model, a second plurality of pixels of the image corresponding to pants in the image; and
removing, from the three-dimensional model of the shoe, a second portion of the three-dimensional model of the shoe that intersects with the second plurality of pixels.

5. A method comprising:
predicting, using a machine learning model, a first plurality of pixels comprising pixels of an image corresponding to a foot in the image;
adding a first virtual cylindrical object to a three-dimensional model of a shoe such that a height of the first virtual cylindrical object extends along a sole of the three-dimensional model of the shoe;
determining a set of pixels comprising pixels of the first plurality of pixels that intersect with the first virtual cylindrical object; and
removing, from the three-dimensional model of the shoe, a first portion of the three-dimensional model of the shoe that intersects with the set of pixels.

6. The method of claim 5, further comprising adding a virtual conical object to the three-dimensional model of a shoe such that the virtual conical object extends out of the three-dimensional model of the shoe.

7. The method of claim 6, wherein the first plurality of pixels further comprises pixels of the image corresponding to a leg in the image, and wherein the set of pixels further comprises the pixels corresponding to the leg that intersect with the virtual conical object.

8. The method of claim 7, further comprising adding a second virtual object to the three-dimensional model of the shoe such that a portion of the second virtual object is positioned within the three-dimensional model of the shoe, wherein the set of pixels further comprises the pixels corresponding to the leg that intersect with the second virtual object.

9. The method of claim 8, further comprising adding a virtual spherical object to the three-dimensional model of the shoe such that the virtual spherical object is positioned between the second virtual object and the virtual conical object, wherein the set of pixels further comprises the pixels corresponding to the foot and the pixels corresponding to the leg that intersect with the virtual spherical object.

10. The method of claim 5, further comprising predicting, using the machine learning model, a scale and a position of the foot in the image, wherein adding the first virtual cylindrical object to the three-dimensional model of the shoe comprises scaling and positioning the first virtual cylindrical object based on the scale and the position of the foot in the image.

11. The method of claim 5, further comprising:
predicting, using the machine learning model, a second plurality of pixels of the image corresponding to pants in the image; and
removing, from the three-dimensional model of the shoe, a second portion of the three-dimensional model of the shoe that intersects with the second plurality of pixels.

12. The method of claim 5, wherein the first virtual cylindrical object is positioned within the three-dimensional model of the shoe without intersecting the three-dimensional model of the shoe.

13. The method of claim 5, further comprising:
generating a two-dimensional model of the shoe from the three-dimensional model of the shoe after removing the first portion from the three-dimensional model of the shoe; and
superimposing the two-dimensional model of the shoe onto the image.

14. A system comprising:
a memory; and
a processor communicatively coupled to the memory, the processor configured to:
predict, using a machine learning model, a first plurality of pixels comprising pixels of an image corresponding to a foot in the image;
add a first virtual cylindrical object to a three-dimensional model of a shoe such that a height of the first virtual cylindrical object extends along a sole of the three-dimensional model of the shoe;
determine a set of pixels comprising pixels of the first plurality of pixels that intersect with the first virtual cylindrical object; and
remove, from the three-dimensional model of the shoe, a first portion of the three- dimensional model of the shoe that intersects with the set of pixels.

15. The system of claim 14, wherein the processor is further configured to add a virtual conical object to the three-dimensional model of a shoe such that the virtual conical objects extends out of the three-dimensional model of the shoe.

16. The system of claim 15, wherein the first plurality of pixels further comprises pixels of the image corresponding to a leg in the image, and wherein the set of pixels further comprises the pixels corresponding to the leg that intersect with the virtual conical object.

17. The system of claim 16, wherein the processor is further configured to add a second virtual object to the three-dimensional model of the shoe such that a portion of the second virtual object is positioned within the three-dimensional model of the shoe, wherein the set of pixels further comprises the pixels corresponding to the leg that intersect with the second virtual object.

18. The system of claim 14, wherein the processor is further configured to predict, using the machine learning model, a scale and a position of the foot in the image, wherein adding the first virtual cylindrical object to the three-dimensional model of the shoe comprises scaling and positioning the first virtual cylindrical object based on the scale and the position of the foot in the image.

19. The system of claim 14, wherein the processor is further configured to:
   predict, using the machine learning model, a second plurality of pixels of the image corresponding to pants in the image; and
   remove, from the three-dimensional model of the shoe, a second portion of the three-dimensional model of the shoe that intersects with the second plurality of pixels.

20. The system of claim 14, wherein the first virtual cylindrical object is positioned within the three-dimensional model of the shoe without intersecting the three-dimensional model of the shoe.

* * * * *